Sept. 1, 1959 H. J. BARRE ET AL 2,901,960
FLOOR STRUCTURE FOR A GRAIN STORAGE BIN
Filed Oct. 25, 1957 2 Sheets-Sheet 1

INVENTOR.
MERRILL E. RADER
HENRY J. BARRE
BY WAYNE G. GOODYEAR
CORBETT, MAHONEY & MILLER
ATTYS.
BY Wm. V. Miller Sept. 1, 1959   H. J. BARRE ET AL   2,901,960
FLOOR STRUCTURE FOR A GRAIN STORAGE BIN
Filed Oct. 25, 1957   2 Sheets-Sheet 2

INVENTOR.
MERVIL E. RADER
HENRY J. BARRE
BY WAYNE G. GOODYEAR
CORBETT, MAHONEY & MILLER,
ATTYS
BY Wm V. Miller United States Patent Office 2,901,960
Patented Sept. 1, 1959

2,901,960

FLOOR STRUCTURE FOR A GRAIN STORAGE BIN

Henry J. Barre, Mansfield, Merill E. Rader, Columbus, and Wayne G. Goodyear, London, Ohio, assignors to Steel Company of Ohio, Inc., Columbus, Ohio, a corporation of Ohio Application October 25, 1957, Serial No. 692,348

5 Claims. (Cl. 98—55)

Our invention relates to a floor structure for a grain storage bin. It has to do, more particularly, with a floor structure for a grain storage bin of the circular type which is formed of sheet metal, the floor structure being designed to adequately support the grain stored in the bin and to provide for ventilation of the stored grain.

Many types of floor structures have been provided for grain storage bins of the circular sheet metal type. However, these floor structures have usually been of a complicated and expensive construction. For example, one prior art type consisted of rectangular perforated sections supported side-by-side. Obviously, such sections are not readily adaptable to mounting in a circular bin and considerable cutting with resultant waste of material is required in fitting the sections in the bin. Furthermore, such rectangular sections must be supported on an expensive supporting structure built up underneath them. Usually, with this prior art type of floor structure, it is also necessary to build air chambers beneath the floor for receiving air from a blower and supplying it up through the perforations in the floor to circulate through the bin in order to dry and keep the grain dry. To construct these air chambers in the manner of the prior art is costly and the blower arrangements usually provided in association with the air chambers are also costly.

It is one object of our invention to provide a floor structure for a grain storage bin of the circular sheet metal type which is formed of interfitting sheet metal segmental sections which adequately support the grain, some of such sections being perforated to allow circulation of air upwardly through the grain supported on the floor sections.

Another object of our invention is to provide a floor structure consisting of interfitting sheet metal segmental sections which are so designed that the interfitting rib between adjacent sections provides a rigid radial supporting rib which cooperates with simple supporting blocks, provided with cradles for receiving the rib, that serve as the sole supporting means for such sections.

Another object of our invention is to provide a floor structure for a grain bin consisting of interfitting segmental sheet metal panels, the interfitting joint between adjacent panels being so designed that the weight of the grain increases the seal at such joint.

A further object of our invention is to provide a floor structure for a grain bin which is so designed that it is not necessary to construct expensive air chambers beneath the floor sections.

Still another object of our invention is to provide a floor structure for a grain bin having a special blower unit associated therewith.

Various other objects will be apparent.

In the accompanying drawings, we have illustrated one example of our floor structure for grain storage bins. However, it is to be understood that details of this floor structure may be varied without departing from basic principles of our invention.

Figure 2:
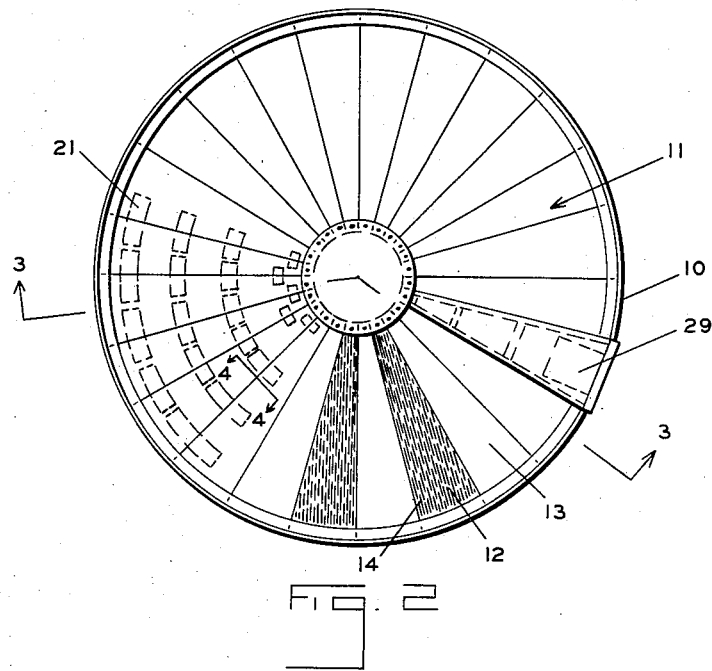
Figure 2 is a horizontal sectional view through the grain storage bin taken along line 2—2 of Figure 3 and showing our floor structure.
Figure 3:
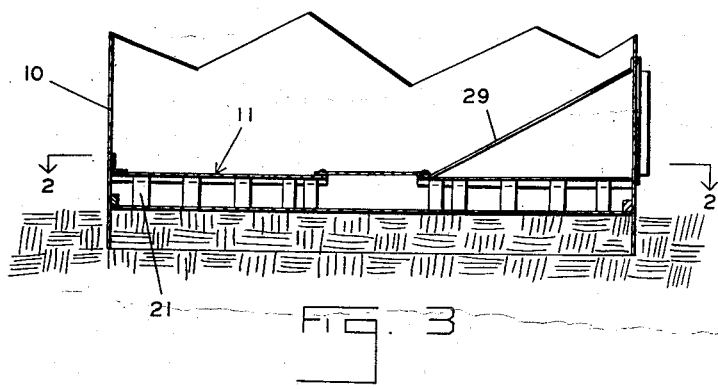
Figure 3 is a vertical sectional view taken along line 3—3 of Figure 2 through the floor structure.

With reference to the drawings, in Figures 2 and 3 we have illustrated the general arrangement of a grain storage bin in which our floor structure is incorporated. The bin is shown as comprising a circular upstanding side wall 10 which is embedded in the ground, as shown in Figure 3. Within this circular wall 10 and resting on the ground is our floor structure indicated generally at 11.

Figure 1:
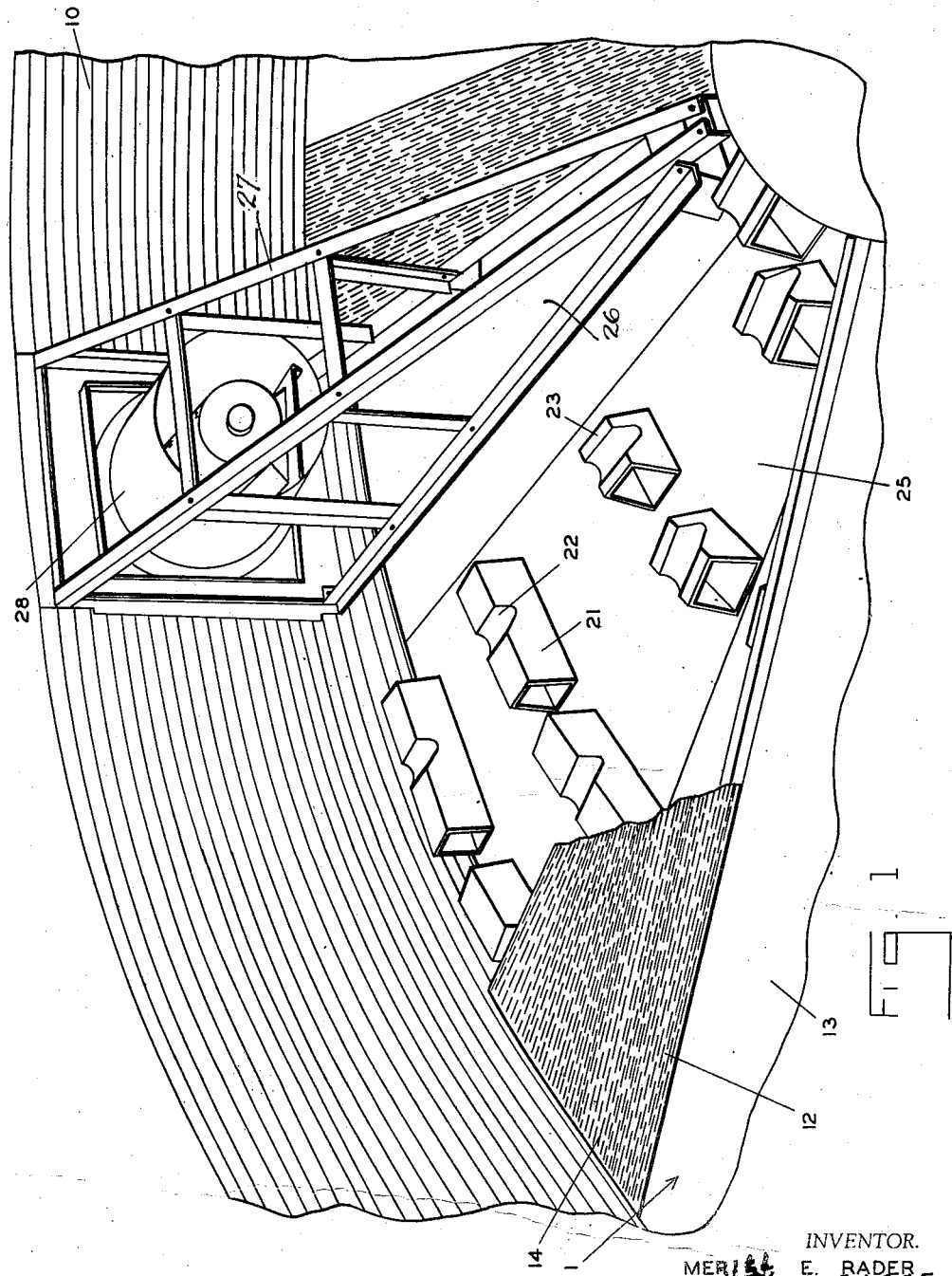
Figure 1 is a perspective view, partly broken away, of a grain storage bin floor structure constructed in accordance with our invention.
Figure 4:
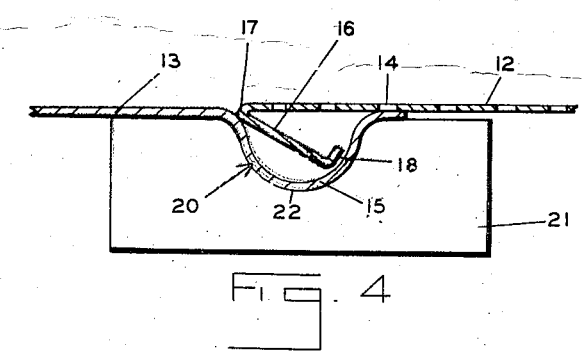
Figure 4 is an enlarged detail in vertical section taken along line 4—4 of Figure 2 and showing the self-sealing interfitting joint between two adjacent segmental sections of the floor.

As shown best in Figures 1 and 4, our floor structure consists of a series of segmental or pie-wedge sections 12 and 13 which alternate with each other. The sections 12 are provided with perforations 14 of a suitable size to permit the upward passage of air without permitting the grain to drop therethrough. The sections 12 and 13 are designed to interfit with each other and for this purpose, the right hand edge of each section (Figure 4) is provided with a substantially semi-circular valley or channel 15 and the left hand edge of each section is provided with a depending inwardly inclined flange 16. The flange 16 is bent sharply downwardly and inwardly to provide the sealing shoulder 17 and the extreme inner edge of the flange 16 is upturned sharply to provide a lip 18. The lip 18 is adapted to be disposed within the channel 15 and contact the outer wall thereof at a level close to the bottom of the channel. The shoulder 17 will contact the opposed wall of the channel at its top portion. Thus, weight on the section 12 will cause the flange 16 to swing downwardly about the lip 18 as a fulcrum to cause the shoulder 17 to more tightly engage the channel and enhance the seal at this joint as well as to keep adjacent panels flush with each other.

Thus, the interfitting edges of the sections 12 and 13 provide a depending rib structure 20 which extends radially the full length of the sections 12 and 13. This provides a strong supporting rib structure extending radially between each pair of adjacent floor sections. For supporting these ribs, a series of blocks 21, having rib-receiving cradles 22, are provided. As shown in Figure 1, these blocks are preferably also formed of sheet metal shaped into block form. For each rib, a series of the blocks is spaced radially from the center of the bin, and it will be noted from Figure 1 that these blocks are of gradually increasing width from the center of the bin outwardly. Thus, each block is provided with a pair of flat supporting surfaces 23 on opposite sides of the cradle 22 and the flat under surfaces of the sections 12 and 13 will rest on these block surfaces. Thus, the surfaces 23 are of greater area on each succeeding outwardly spaced block to provide a greater area of supporting surface for the increasing areas of the sections 12 and 13. At the center of the bin where the sections 12 and 13 meet, a covering center disc 24 may be fastened thereon.

The blocks 21 may be rested directly on the surface of the ground, but it is preferred that flat segmental sections 25 of sheet metal be laid on the ground first and these need not interlock. This not only provides a better support for the blocks, but provides a bottom wall for the air chamber which will be formed beneath the interfitting sections 12 and 13. Obviously, the spaced blocks 21 will not interfere with circulation of air beneath the interfitting floor sections throughout the area of the floor structure.

One of the sections 12 or 13 is not positioned in the floor so as to provide a segmental opening 26 in the floor, as shown best in Figure 1. Over this opening 26 is positioned a frame 27 which has a blower 28 positioned therein at its outer end in association with an opening in the side wall 10. The lower side of this frame fits around the opening 26 and its upstanding sides taper inwardly whereas its top side tapers downwardly towards the center of the bin. This frame 27 is covered with sheet metal sections 29, as shown in Figures 2 and 3, and thus provides an inwardly directed tapering duct for directing air, drawn in by the blower unit 28, downwardly through the opening 26, so that it will circulate underneath the interfitting panels 12 and 13 and upwardly through the perforations 14 of the sections 12.

It will be apparent from the above description that we have provided a simple, inexpensive floor structure for a grain storage bin of the circular type. This floor structure will adequately support the grain in the bin and will provide for proper ventilation thereof. Since the sections are designed to fit the circular bin, no cutting and waste of material will be required. Also the sections can be easily and quickly positioned in the bin. Expensive supporting structure is not required since the interfitting ribs provide the strong radial supporting ribs which rest on the simple supporting blocks provided. The blower unit can be readily positioned in one of the spaces where one of the pie-wedge sections is not inserted and will serve to effectively circulate air beneath the floor structure. Also, the floor structure is of such a nature that it can be disassembled and reassembled repeatedly.

Various other object will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described our invention, what we claim is:

1. In a grain storage bin, a floor structure composed of wedge-shaped interfitting sections spaced above a supporting surface to provide an air chamber and having an upstanding circular side wall, some of said sections being perforated to permit upward flow of air from said chamber, a blower duct communicating with the outside through an opening in said side wall, said duct being fitted into a wedge-shaped space between spaced floor sections and extending above the plane thereof, said duct having inwardly converging side walls and a downwardly tapering top wall so as to direct the air supplied by the blower downwardly through said wedge-shaped space into said air chamber.

2. A circular load-bearing structure of the type described comprising wedge-shaped sections having tapering longitudinal edges, the adjacent tapering longitudinal edges of adjacent sections interfitting to form radially extending depending supporting ribs, each of said ribs comprising a channel-forming portion of substantially semi-circular form on one of the tapering longitudinal edges of a first one of said sections and an angularly disposed flange on the adjacent tapering longitudinal edge of a second one of said sections, said channel-forming portion comprising an inner curved wall portion joined to the first section at its edge and a continuing outer curved wall portion having an outer and upper extremity which is free, said flange formed on the adjacent edge of the second section being attached to said second section along its edge to provide an upper sealing shoulder and extending downwardly and inwardly of said second section at a sharp angle so that it extends substantially chordally of the semi-circular channel on the first section and has a lower free fulcrum edge engaging the outer curved wall of the channel near the bottom thereof and its upper sealing shoulder engaging the inner curved wall of the channel near the top thereof with the result that pressure applied to the upper surface of the flange-bearing edge of the second section will pivot the flange about its fulcrum edge where it engages the outer curved wall of said channel to thereby more firmly engage said upper sealing shoulder with the inner curved wall of said channel, said outer and upper extremity of the outer curved wall portion of the first section engaging therewith the second section.

3. A structure according to claim 2 in which each depending supporting rib is carried by blocks spaced longitudinal thereof, each of said blocks having a notch in its upper surface to provide a cradle for receiving the rib.

4. A structure according to claim 3 which is a floor structure, said blocks spacing the floor structure above a supporting surface on which the blocks rest to provide an air chamber beneath the floor structure, some of said sections being perforated, and a blower duct fitted into a wedge-shaped space between two of said sections and extending above the plane of said sections, said duct directing air downwardly into said air chamber.

5. A load-bearing structure of the type described comprising sections having adjacent longitudinal edges interfitting to form radially extending depending supporting ribs, each of said ribs comprising a channel-forming portion of substantially semi-circular form on one of the longitudinal edges of a first one of said sections and an angularly disposed flange on the adjacent longitudinal edge of a second one of said sections, said channel-forming portion comprising an inner curved wall portion joined to the first section at its edge and a continuing outer curved wall portion having an outer and upper extremity which is free, said flange formed on the adjacent edge of the second section being attached to said second section along its edge to provide an upper sealing shoulder and extending downwardly and inwardly of said second section at a sharp angle so that it extends substantially chordally of the semi-circular channel on the first section and has a lower free fulcrum edge engaging the outer curved wall of the channel near the bottom thereof and its upper sealing shoulder engaging the inner curved wall of the channel near the top thereof with the result that pressure applied to the upper surface of the flange-bearing edge of the second section will pivot the flange about its fulcrum edge where it engages the outer curved wall of said channel to thereby more firmly engage said upper sealing shoulder with the inner curved wall of said channel, said outer and upper extremity on the outer curved wall of the first section engaging beneath the second section.

References Cited in the file of this patent

UNITED STATES PATENTS

| | | |
|---|---|---|
| 2,180,504 | Bradfield et al. | Nov. 21, 1939 |
| 2,196,391 | Gronert | Apr. 9, 1940 |
| 2,357,705 | Thorne | Sept. 5, 1944 |
| 2,560,141 | Tipps | July 10, 1951 |
| 2,739,677 | Greulich | Mar. 27, 1956 |
| 2,818,009 | Steffen | Dec. 31, 1957 |